United States Patent
Hogue et al.

(10) Patent No.: US 12,214,857 B2
(45) Date of Patent: Feb. 4, 2025

(54) BEADED COMPOSITE STRUCTURAL WEB

(71) Applicant: Textron Innovations Inc., Providence, RI (US)

(72) Inventors: Charles David Hogue, North Richland Hills, TX (US); James Everett Kooiman, Loveland, CO (US); Joseph Richard Carpenter, Jr., Burleson, TX (US); David G. Carlson, North Richland Hills, TX (US); Jonathan Alexander Freeman, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/188,132

(22) Filed: Mar. 22, 2023

(65) Prior Publication Data
US 2024/0317382 A1      Sep. 26, 2024

(51) Int. Cl.
*B64C 1/06*      (2006.01)
*B64C 27/26*     (2006.01)

(52) U.S. Cl.
CPC .............. *B64C 1/061* (2013.01); *B64C 27/26* (2013.01)

(58) Field of Classification Search
CPC .................................. B64C 1/061; B64C 27/26
See application file for complete search history.

(56) References Cited

U.S. PATENT DOCUMENTS

| | | | | |
|---|---|---|---|---|
| 8,312,827 | B1 * | 11/2012 | Free | B29C 70/24 112/475.08 |
| 2022/0234714 | A1 * | 7/2022 | Skilton | B29C 70/202 |

FOREIGN PATENT DOCUMENTS

| | | | | |
|---|---|---|---|---|
| CN | 110234498 A | * | 9/2019 | B29C 39/123 |
| CN | 215759940 U | * | 2/2022 | |
| EP | 3045384 A1 | * | 7/2016 | B64C 1/064 |
| EP | 4058672 B1 | * | 5/2024 | F03D 13/20 |
| WO | WO-2014175795 A1 | * | 10/2014 | B29C 70/42 |
| WO | WO-2024127043 A1 | * | 6/2024 | B29C 33/3842 |

* cited by examiner

*Primary Examiner* — Babajide A Demuren
(74) *Attorney, Agent, or Firm* — Akona IP PC (57) ABSTRACT

An aircraft is described and includes a fuselage; wings attached to the fuselage; and a torque box within the fuselage, the torque box including a side panel, the side panel comprising a composite laminate material including a plurality of stiffening beads integrated therewith.

6 Claims, 11 Drawing Sheets

BEADED COMPOSITE STRUCTURAL WEB

STATEMENT REGARDING FEDERALLY SPONSORED RESEARCH OR DEVELOPMENT

This invention was made with Government support under Agreement No. W911W6-19-9-0002, awarded by the Army Contracting Command-Redstone Arsenal. The Government has certain rights in the invention.

TECHNICAL FIELD

This disclosure relates in general to the field of aircraft and, more particularly, though not exclusively, to a beaded composite structural web for aircraft, particularly rotorcraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached figures.

Figure 1A:
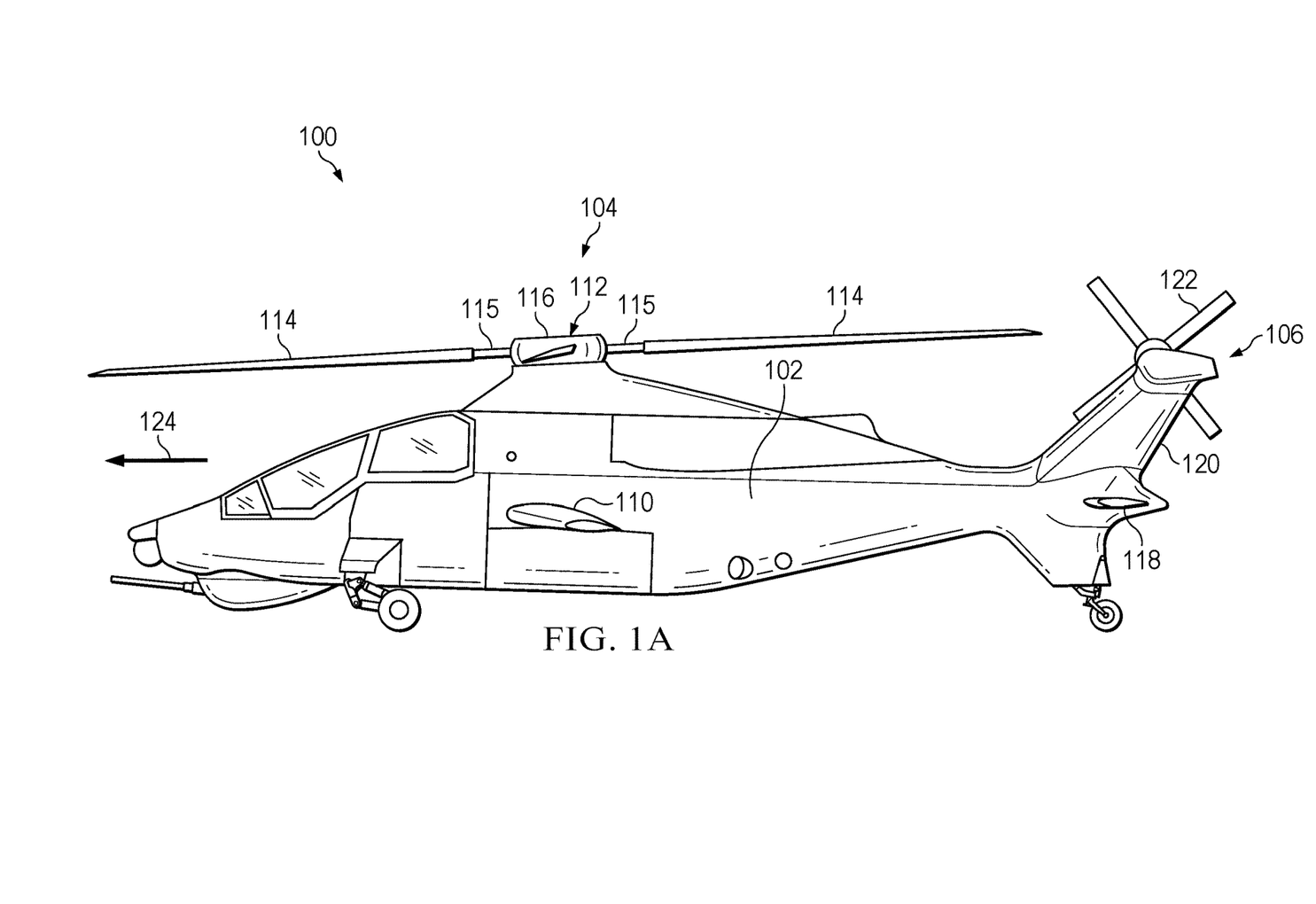
FIGS. 1A and 1B illustrate an example rotorcraft in accordance with features of embodiments described herein.
Figure 1B:
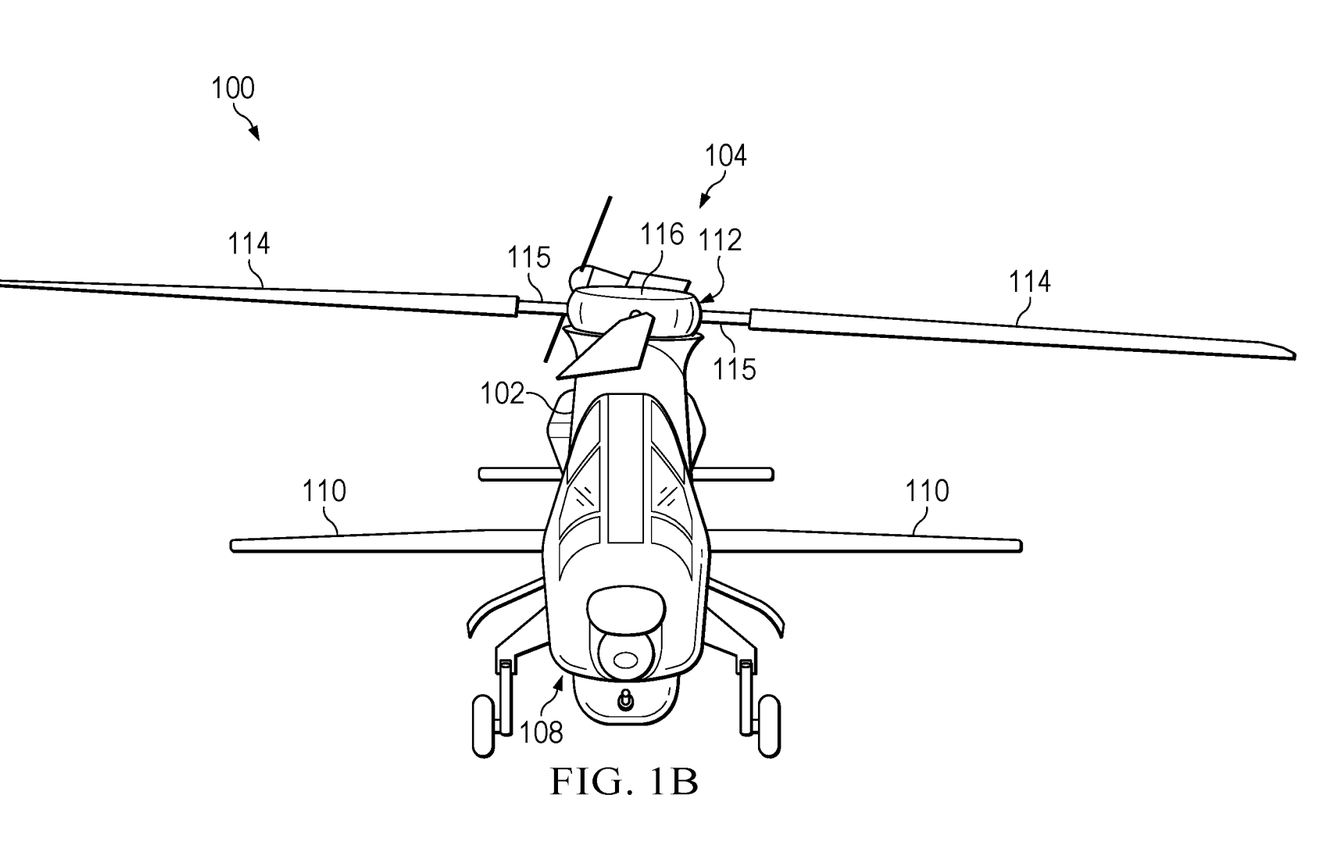

FIGS. 1A and 1B respectively illustrate a side view and a front view of an example aircraft, which in the illustrated example is a rotorcraft 100. As shown in FIGS. 1A and 1B, rotorcraft 100 includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.). In accordance with features of particular embodiments, the fuselage 102 can also include a payload bay covered by a payload bay door 108 disposed under a wing 110, which in some embodiments includes a support structure and actuation mechanism for extending externally stowed payload (e.g., weapons) outboard away from the fuselage 102 to a firing position. It will be recognized that, although not shown in the view illustrated in FIG. 1A, the opposite side of the rotorcraft 100 also includes a wing and a payload bay door corresponding to the wing 110 and payload bay door 108.

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades"). Torque generated by the engine(s) of the rotorcraft causes the rotor blades 114 to rotate, which generates lift. The empennage 106 of the rotorcraft 100 includes a horizontal stabilizer 118, a vertical stabilizer 120, and a tail rotor or anti-torque system 122. Although not shown in the view illustrated in FIG. 1A, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all the of rotor blades 114 are collectively pitched together (e.g., the pitch angle is the same for all blades), which effects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades," "yoke/blades," "hub/yoke/blades," and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 124) for rotorcraft 100.

Rotary-wing aircraft, or rotorcraft, such as rotorcraft 100, are often required to serve a variety of functions. For example, in some instances, rotorcraft may be required to lift heavy objects and either hover in place or move at a relatively low rate of speed. In other instances, rotorcraft may be required to move at a relatively high rate of speed, particularly when they are not lifting an object or otherwise engaged in stationary flight operations.

One example of a rotorcraft that may be called upon to perform multiple functions is a military helicopter, such as an attack helicopter. An attack helicopter may be required at times to hover while loitering over a battlefield or providing close air support, and at other times may be required to move at a relatively high rate of speed to respond to a call for close air support.

Strength, stiffness, dimensional control, durability, and cost are important factors to be considered in the production of components of most aircraft, including rotorcraft 100. For example, in order to reduce the weight of an aircraft, it may be desirable to implement some portion of the airframe thereof using a material that is as strong as but lighter than machined aluminum, which Is typically used for such purposes. Such a material may include, for example, a composite material, including but not limited to a material comprising carbon fiber or a fiberglass reinforced polymer (e.g., epoxy, bismaleimide, polyimide, or thermoplastic). Use of composite materials in aircraft may result in advantages over metal components including weight reduction, ease of component assembly through use of automated layup machinery and rotational molding processes, and virtual elimination of combination fatigue/corrosion issues. Additionally, mechanical properties of components can be tailored using layup design, with tapering thicknesses of reinforcing cloth and cloth orientation. Moreover, composite materials are thermally stable, such that they don't expand/contract excessively with a change in temperature, provide high impact resistance, and offer high impact resistance.

Figure 2:
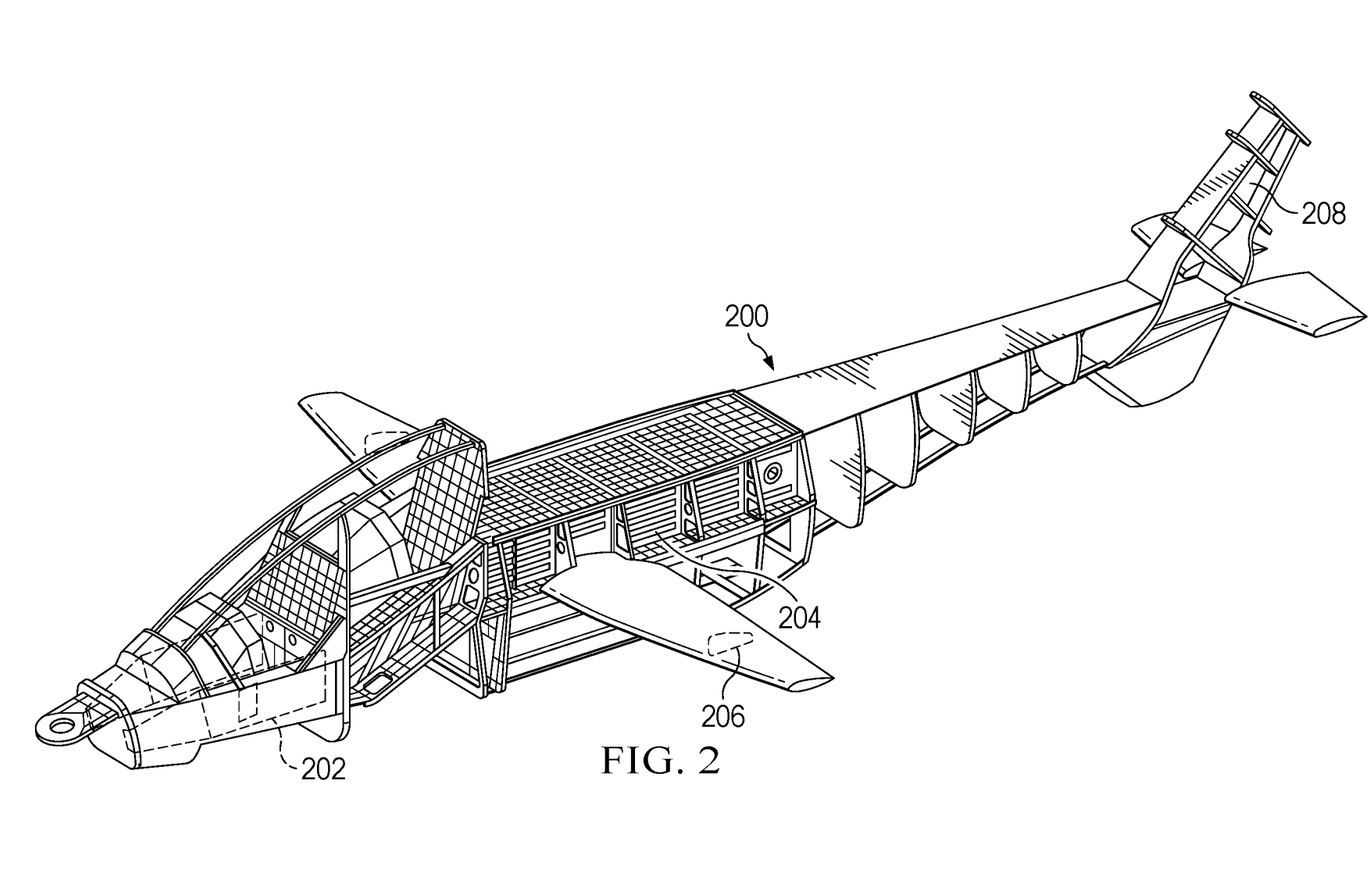
FIG. 2 illustrates an airframe of the rotorcraft of FIGS. 1A and 1B including components of the airframe, such as a torque box and other airframe elements, that may comprise bead-stiffened composite laminate material in accordance with features of embodiments described herein.

As illustrated in FIG. 2, examples of portions and/or components of an airframe 200, which may comprise the airframe of rotorcraft 100 (FIGS. 1A and 1B) that may be implemented using bead-stiffened composite laminate material panels according to embodiments described herein include keel beams 202 in the forward fuselage, portions of a torque box 204 in the mid fuselage, and intermediate ribs 206, 208, in the wings and tail, respectively.

Bead-stiffened composite laminate material components offer structural redundancy, durability, and the ability to tailor stiffness like conventional discrete stiffeners. In particular, bead-stiffened composite laminate components include stiffeners integrated into a continuous, single-cure laminate without the processing requirements or durability concerns of a core-stiffened, sandwich composite panel. Implementation of a quick-cure, stamp-forming process may also dramatically reduce time, cost, and risk of defects for the bead-stiffened composite configuration compared to traditional lay-up.

As illustrated in FIG. 2, in certain rotorcraft, such as rotorcraft 100 (FIGS. 1A and 1B), a torque box, such as torque box 204, is provided for performing a variety of structural functions, including but not limited to housing one or more fuel cells and supporting other components, such as wings, engine(s), transmission system(s), tail boom, etc. (not shown in FIG. 2 for the sake of clarity of illustration).

Figure 3:
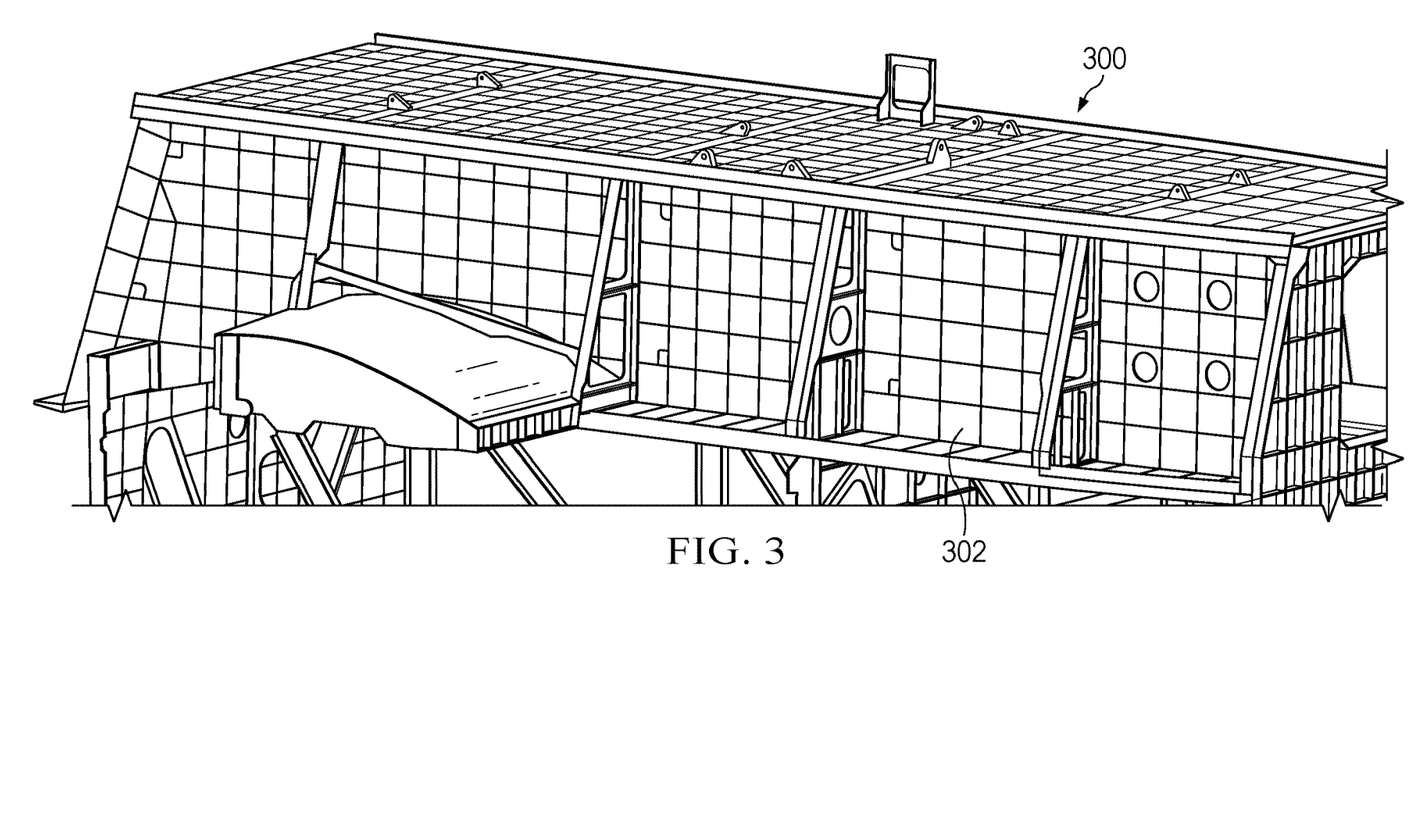
FIG. 3 illustrates a torque box comprising keels configured as one-piece machined aluminum panels with an integral stiffener grid in accordance with conventional embodiments.

Referring now to FIG. 3, the side panels of a torque box 300 (i.e., keels 302) may conventionally be configured as one-piece machined aluminum panels with an integral stiffener grid pattern. Such a keel configuration provides the necessary stiffness and strength to enable desired aircraft performance; however, due to manufacturing constraints and the grid pattern, the configuration is relatively heavy. Moreover, due to the rigidity of keels 302 constructed in this fashion, a hydraulic ram (hydram) event (e.g., an explosion) in the fuel cells enclosed in the torque box 300 may lead to increased risk of catastrophic damage to other parts of the torque box structure, as little energy is attenuated by the rigid keels.

To address the aforementioned concerns with regard to an aluminum torque box, such as torque box 300 as illustrated in FIG. 3, a composite solution may be deployed. A common solution for implementing composite shear-resistant webs for aircraft is to use sandwich panel construction with a honeycomb core. Such composite panels are structurally efficient, but are stiff out-of-plane, resulting in severe damage in response to a hydram event.

A bead stiffened composite keel could be tailored to provide adequate structural stiffness and allow for appropriate compliance and/or displacement in the event of a hydram event to minimize damage to the torque box and other components, while still realizing weight savings over the baseline aluminum keel described above. Unfortunately, conventional beaded composite configurations are difficult (i.e., labor prohibitive) to layup and are subject to wrinkling and void defects. Blowout panels can be used to release some of the energy from a hydram event; however, such panels increase overall rotorcraft design complexity and cost.

In accordance with features of embodiments described herein, a web for an aircraft may be implemented as a composite single layup beaded panel. Advantages of such a beaded composite web include that it is shear-resistant, the beading prevents buckling, and the single layup is weight-efficient. When such a web is used as an exterior torque box wall, the geometry thereof enables the web to be capable of flexing during a hydram event, thereby reducing damage to the structure. Additionally, such a beaded composite web is approximately 20-25% lighter than a comparable aluminum web with a stiffener grid (as illustrated in FIG. 3).

A novel bead end design that incorporates a straight radius (R.50") at the base of the bead to the ends thereof and a gentle 10-degree (or less) ramp is also disclosed. This bead end design configuration allows for a smooth transition from the bead portion of the panel to a flat portion of the panel, thereby minimizing ply distortion and improving part producibility by reducing labor, cycle time and cost.

Figure 4:
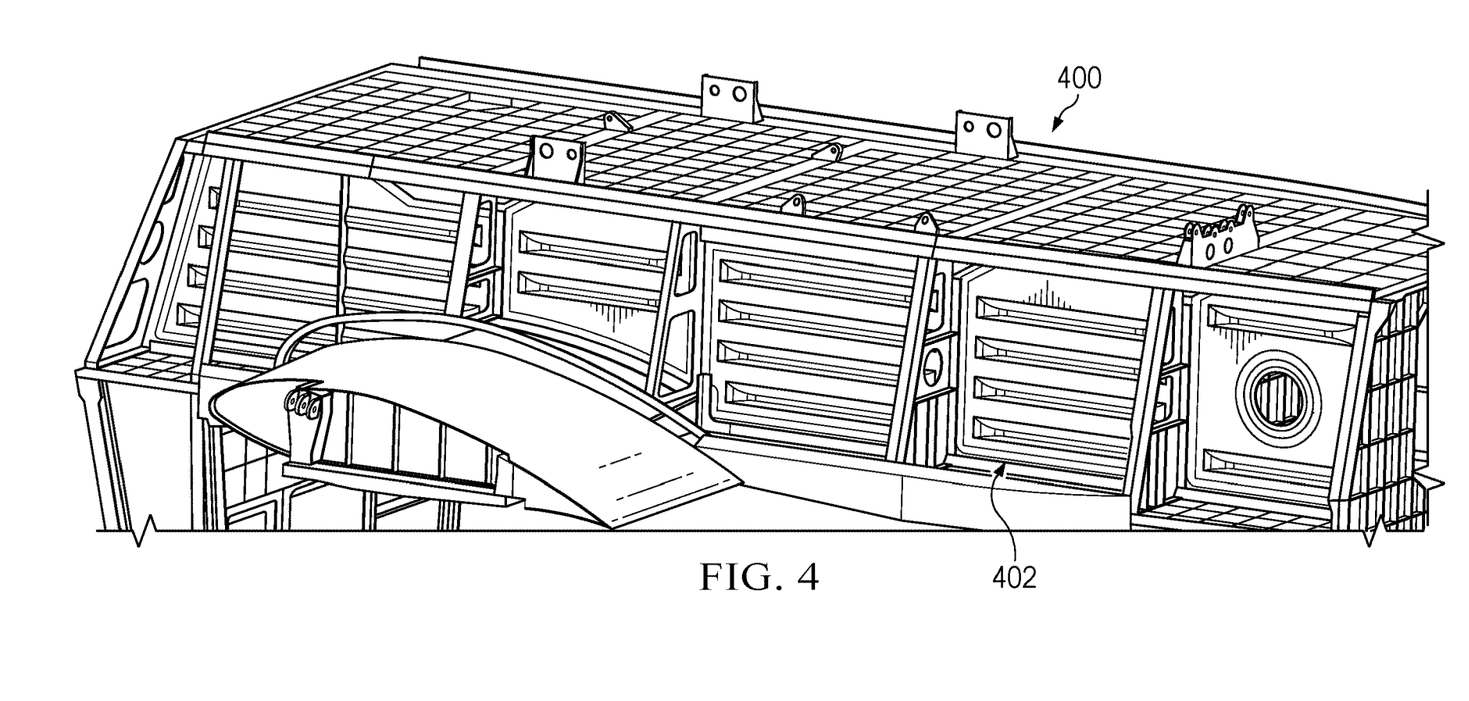
FIG. 4 illustrates a torque box comprising keels configured as one piece panels comprising bead-stiffened composite laminate material panels in accordance with features of embodiments described herein.

FIG. 4 illustrates a torque box 400 constructed in accordance with embodiments described herein. In particular, torque box 400 includes side panels, or keels 402, that are constructed from bead-stiffened composite laminate material panels according to embodiments described and illustrated herein.

Figure 5:
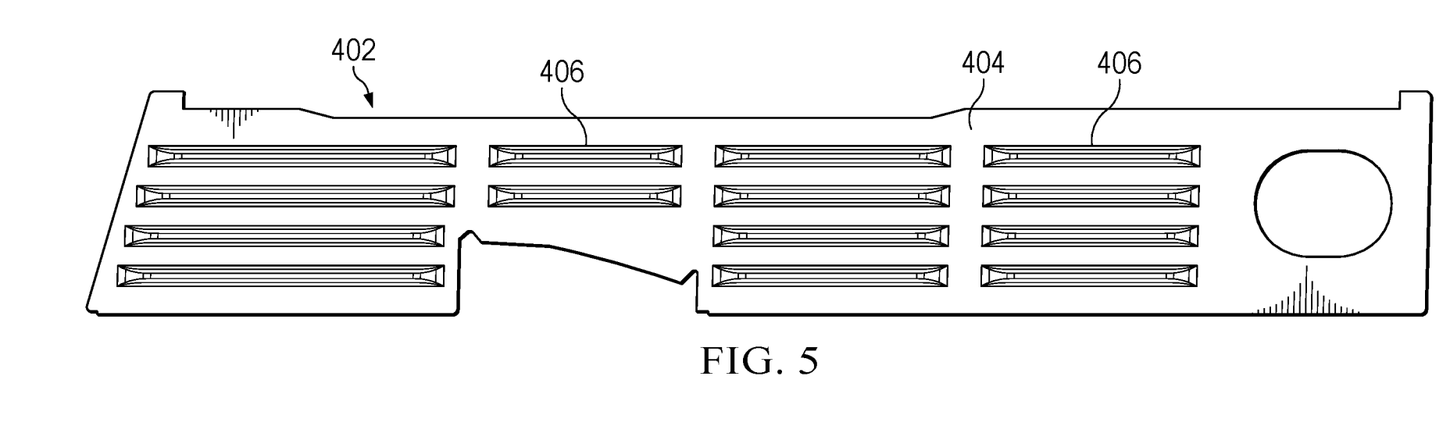
FIG. 5 illustrates additional details of a keel of the torque box of FIG. 4 in accordance with features of embodiments described herein.

As shown in FIGS. 4 and 5, keel 402 comprises bead-stiffened composite laminate material panels including a flat portion 404 and a plurality of beads 406. In one embodiment, a layup process includes laying layers or plies of woven composite material over a series of beads. Unidirectional material may also be used, primarily in localized areas that are flat or close to flat. At the gentle transition from the beads to the flat areas there is a change in true length that the material is navigating across the width of the part. The weave is stretched and distorted slightly, depending on the angle of the fibers (e.g., 0/90 vs. +/−45), to allow the ply to lay flat either by moving the excess material outside the nominal boundary of the part or by contracting the width. This process can be performed ply-by-ply using conventional hand lay-up or using specialized tooling and equipment to form plies, either individually or in a complete stack-up of material at once, as in the previously mentioned stamp-forming process.

Figure 6:
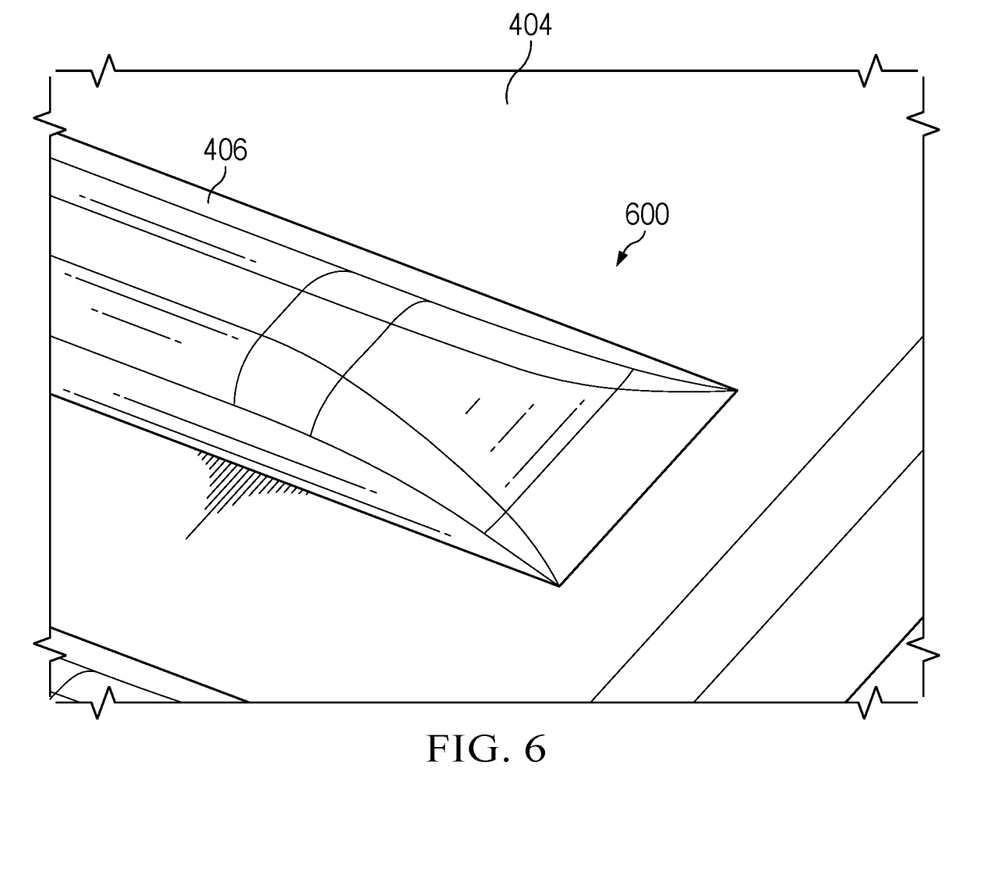
FIG. 6 illustrates additional details of a bead of the keel of FIG. 5 in accordance with features of embodiments described herein.

FIG. 6 is a more detailed view of an end 600 of one of the beads 406. As shown in FIG. 6, and in accordance with aspects and features of embodiments described herein, rather than being rounded, end 600 is flat, or straight in order to minimize and/or eliminate warpage (which may include wrinkles and/or fiber distortion) of the material around the bead end 600.

Figure 7A:
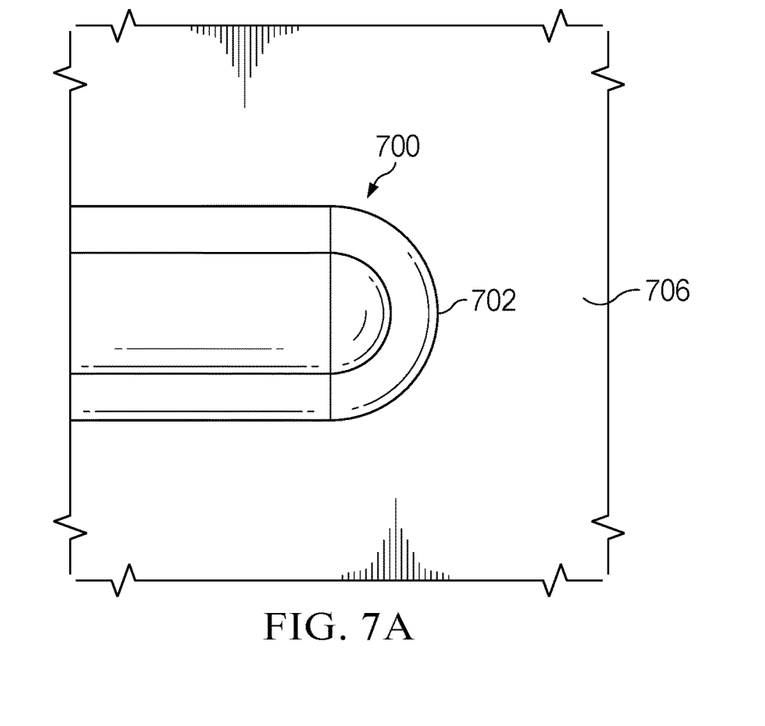
FIGS. 7A and 7B illustrate a rounded bead end for a beaded composite structure web in accordance with one embodiment.
Figure 7B:
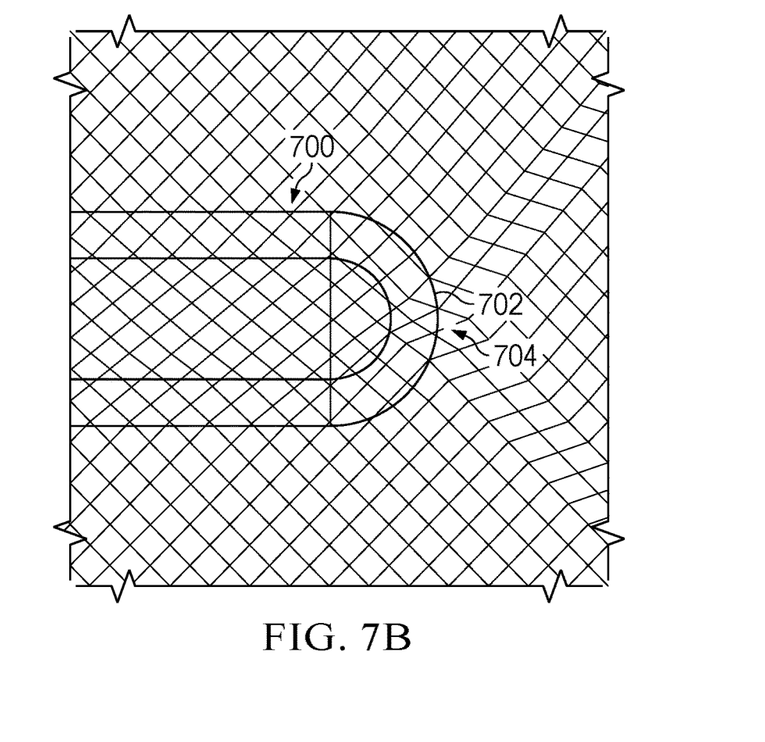

FIGS. 7A and 7B illustrate a bead end portion 700 comprising a rounded end 702. As best illustrated in FIG. 7B, rounded end 702 results in warpage 704 (which may include wrinkling and/or distortion) of a flat portion 706 of the composite material proximate the bead end 700.

Figure 8A:
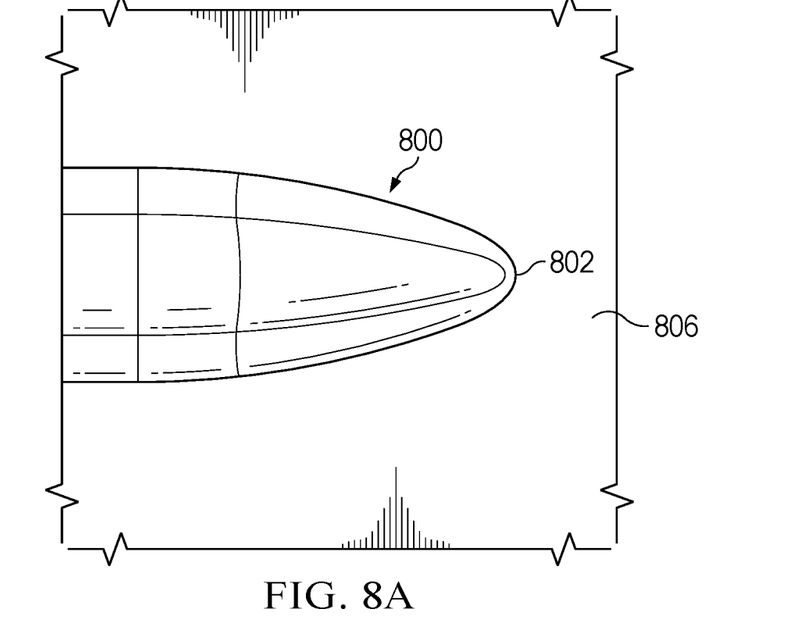
FIGS. 8A and 8B illustrate a pointed bead end for a beaded composite structure web in accordance with one embodiment.
Figure 8B:
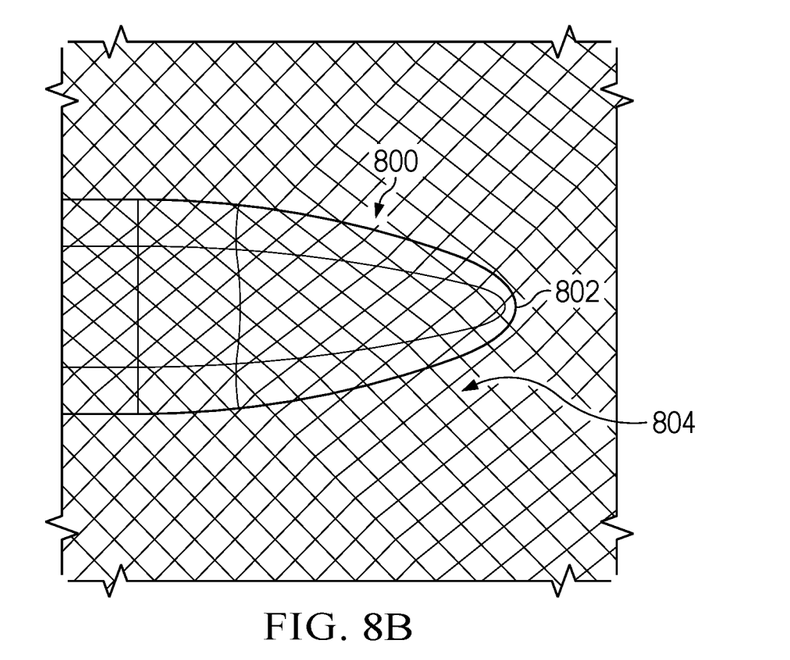

FIGS. 8A and 8B illustrate a bead end portion 800 comprising a pointed end 802. As best illustrated in FIG. 8B, pointed bead end 802 also results in warpage 804 (which may include wrinkling and/or distortion) of a flat portion 806 of the composite material proximate the bead end 800.

Severe distortion of fibers can affect the mechanical properties (e.g., strength, stiffness, etc.) of the resulting part due to fibers being off axis from the intended direction to carry loading. Significant local distortions classify as wrinkles and interrupt the ability of fibers to transmit loads within the part. Changes in properties can also create an imbalance in properties between layers of the laminate and cause overall warpage of the part, which can affect the fit in the next assembly or require force ("pre-loading") for the part to fit in the assembly.

Figure 9A:
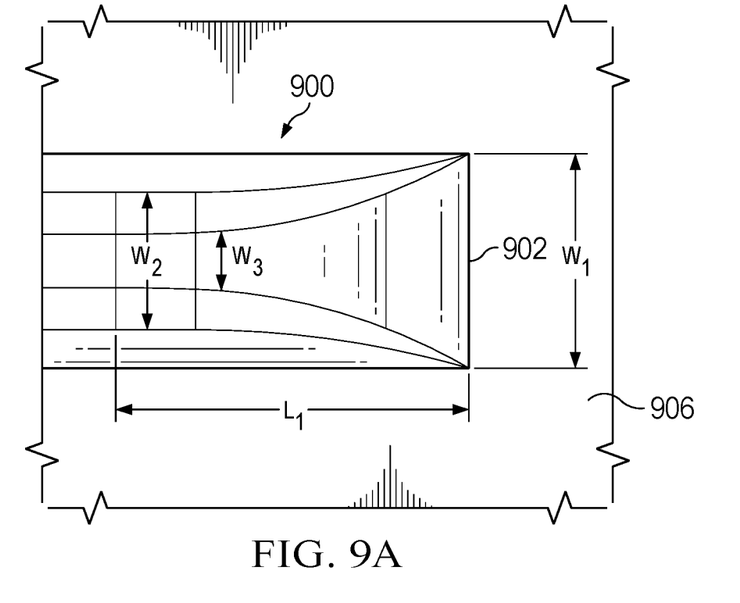
FIGS. 9A-9C illustrate a square bead end for a beaded composite structure web in accordance with one embodiment.
Figure 9B:
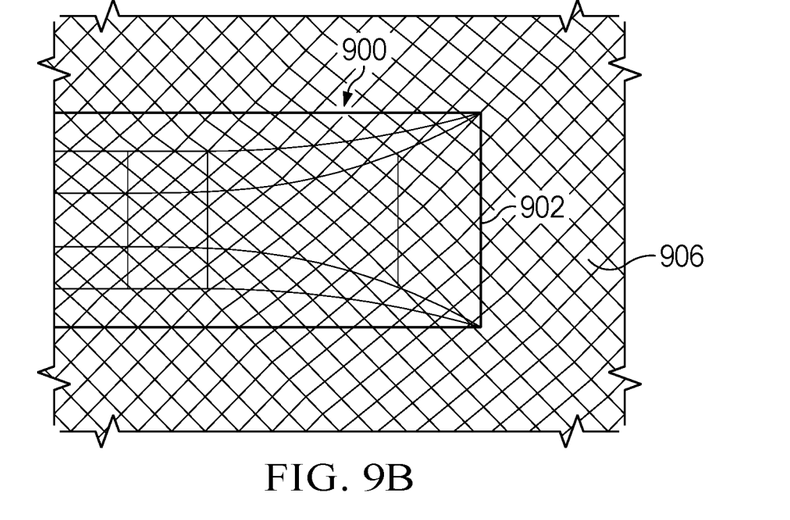

FIGS. 9A and 9B illustrate a bead end portion 900 comprising an end 902 that may be described as square, flat, or straight, in accordance with features of embodiments described herein. As best illustrated in FIG. 9B, bead end 902 results in little to no warpage of a flat portion 906 of the composite material proximate the bead end.

The closer the fiber angle can be maintained to the intended direction the better the part laminate will match the intended design and analysis for mechanical properties. The more consistent the mechanical properties are maintained through the part laminate the less likely the overall part is to warp away from its intended shape.

Figure 9C:
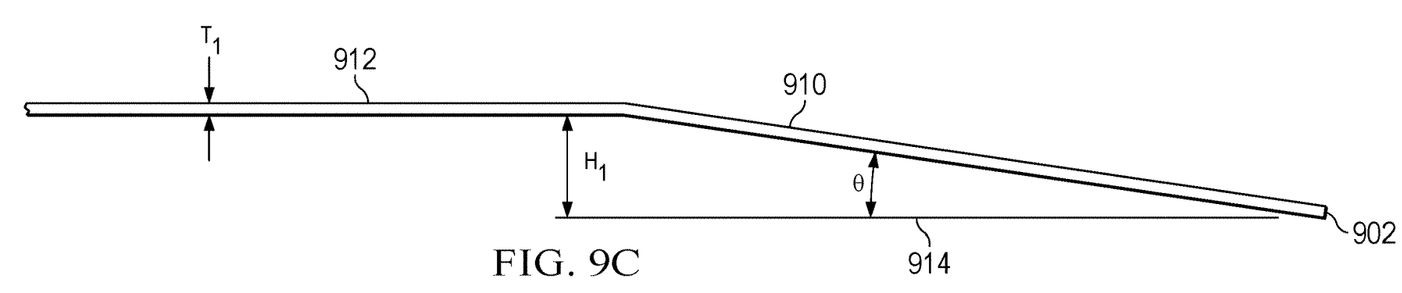

FIG. 9C illustrates a cross-sectional representation of bead portion 900 in accordance with features of embodiments described herein. As shown in FIG. 9C, bead portion 900 includes a ramp portion 910 extending from a body 912 of the bead to the end 902, such that the ramp portion 910 forms an angle $\ominus$ with a surface level 914 of the flat portion. In particular embodiments, $\ominus$ is less than or equal to approximately 10 degrees. A distance between flat portion surface level 914 and body 912 is represented as a height $H_1$. A thickness of the composite material is represented as a thickness $T_1$. Referring again to FIG. 9A, other dimensions of note with regard to the bead portion 900 include a length $L_1$ representing a distance between the bead end 902 and a point at which ramp portion 910 connects to body 912, and various widths $W_1$, $W_2$, and $W_3$. It will be recognized that one or more of the dimensions of beads as represented in FIGS. 9A and 9C (e.g., $\ominus$, $H_1$, $T_1$, $L_1$, $W_1$, $W_2$, and $W_3$) as well as other dimensions not specifically noted may depend on one or more of the other ones of the dimensions. Additionally, one or more of the dimensions of beads as represented in FIGS. 9A and 9C may further depend on distances between the beads provided on a particular panel, the total number of beads provided on the panel, an overall width and/or length of the panel, a function of the panel, and/or other considerations and/or dimensions. In some instances, the relationship between and/or among one or more of the various dimensions may be defined by one or more mathematical equations.

The bead dimensions, which describe the bead height and width, and the rate of transition from the highest portion of the bead down to the flat areas, can be changed to affect stiffness and stiffness transition over the part. The taller, wider, and thicker the top portion of the bead ($H_1$, $W_3$, $T_1$), the more effective the beads are in stiffening the keel. The lower the transition angle at the end of the bead ($\ominus$) or the greater the overall width or width of the sides ($W_1$, $W_2$) the more gradual the change in stiffness from the bead to the flat areas. Changes in the bead dimensions also have an effect of how easily composite plies can be placed over the geometry, primarily in the amount of excess material and how much the excess material has to be stretched or distorted prior to reaching the flat areas.

It will be recognized that, although the ribs are shown as having a particular arrangement with respect to the torque box, other arrangements may be advantageously deployed in alternative embodiments. For example, the ribs may be arranged such that they extend fore and aft or diagonally, rather than up and down. Embodiments described herein may be used as an exterior keel panel and tank wall, inter alia. In particular, the bead geometry allows the keel web to flex during a hydram event to reduce the risk of proliferation of structural damage. Moreover, embodiments described herein may be used in a variety of structural applications; the panel comprises a shear resistant web with beads that prevent buckling. Particular embodiments can reduce the overall weight of the structural keel web by 20-25% over comparable metallic (e.g., aluminum) grid-stiffened keel construction. Novel bead end design allows for a smooth transition from the bead ends to the flat portion of the panel, minimizing ply distortion and thereby improving part producibility (reducing labor, cycle time and cost) for hand layup.

Example 1 provides an aircraft comprising a fuselage; wings attached to the fuselage; and a torque box within the fuselage, the torque box including a side panel, the side panel comprising a composite laminate material including a plurality of stiffening beads incorporated into an exterior surface of the side panel.

Example 2 provides the aircraft of example 1, wherein the side panel includes a first side panel on a first side of the torque box and a second side panel on a second side of the torque box opposite the first side.

Example 3 provides the aircraft of example 1, wherein the plurality of stiffening beads are integrated with the side panel.

Example 4 provides the aircraft of example 1, wherein the plurality of stiffening beads extend parallel to one another.

Example 5 provides the aircraft of example 1, wherein ends of the stiffening beads are square.

Example 6 provides the aircraft of example 1, wherein end portions of the stiffening beads comprise ramp portions extending from top surfaces of the stiffening beads to a flat portion of the side panel.

Example 7 provides the aircraft of example 6, wherein an angle between a surface of the flat portion of the side panel and each of the ramp portions is less than approximately 10 degrees.

Example 8 provides the aircraft of example 1, further comprising an additional component comprising a second panel comprising a composite laminate material including a plurality of stiffening beads integrated therewith.

Example 9 provides the aircraft of example 1, wherein the additional component comprises at least one of a keel beam, a rib of one of the wings, and rib of a tail of the aircraft.

Example 10 provides a torque box for containing damage subsequent to a hydraulic ram (hydram) event within the torque box, the torque box disposed within a fuselage of an aircraft and including first and second side panels disposed on opposite sides of the torque box, wherein each of the side panels comprises a composite laminate material including a plurality of stiffening beads integrated therewith.

Example 11 provides the torque box of example 10, wherein the plurality of stiffening beads extend parallel to one another.

Example 12 provides the torque box of example 10, wherein ends of the stiffening beads are square.

Example 13 provides the torque box of example 10, wherein end portions of the stiffening beads comprise ramp portions extending from top surfaces of the stiffening beads to a flat portion of the side panels.

Example 14 provides the torque box of example 13, wherein an angle between a surface of the flat portion of the side panel and each of the ramp portions is less than approximately 10 degrees.

Example 15 provides the torque box of example 10, wherein the stiffening beads have at least one thickness dimension $T_1$, at least one height dimension $H_1$, and at least one width dimension $W_1$, and the ramp portion has at least one length dimension $L_1$, and wherein the dimensions $T_1$, $H_1$, $W_1$, and $L_1$, are related to one another by at least one mathematical equation.

Example 16 provides the torque box of example 10, wherein the composite laminate material comprises a carbon fiber material.

Example 17 provides a component for an aircraft comprising a panel fabricated from a composite laminate material, the panel including a plurality of stiffening beads integrated therewith, wherein the stiffening beads extend parallel to one another from proximate one end of the panel to proximate an opposite end of the panel.

Example 18 provides the component of example 17, wherein ends of the stiffening beads are square.

Example 19 provides the component of example 17, wherein end portions of the stiffening beads comprise ramp portions extending from top surfaces of the stiffening beads to a flat portion of the panel.

Example 20 provides the component of example 19, wherein an angle between a surface of the flat portion of the panel and each of the ramp portions is less than approximately 10 degrees.

The diagrams in the FIGURES illustrate the architecture, functionality, and operation of possible implementations of various embodiments of the present disclosure. It should also be noted that, in some alternative implementations, the function(s) associated with particular FIGURES may occur out of the order presented. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

What is claimed is:

1. A torque box for containing damage subsequent to a hydraulic ram (hydram) event within the torque box, the torque box disposed within a fuselage of an aircraft and including first and second side panels disposed on opposite sides of the torque box, wherein each of the side panels comprises a composite laminate material including a plurality of stiffening beads integrated therewith and wherein end portions of the stiffening beads comprise ramp portions extending from top surfaces of the stiffening beads to a flat portion of the side panels.

2. The torque box of claim 1, wherein the plurality of stiffening beads extend parallel to one another.

3. The torque box of claim 1, wherein ends of the stiffening beads are square.

4. The torque box of claim 1, wherein an angle between a surface of the flat portion of the side panel and each of the ramp portions is less than approximately 10 degrees.

5. The torque box of claim 1, wherein the stiffening beads have at least one thickness dimension T1, at least one height dimension H1, and at least one width dimension W1, and the ramp portions have at least one length dimension L1, and wherein the dimensions T1, H1, W1, and L1, are related to one another by at least one mathematical equation.

6. The torque box of claim 1, wherein the composite laminate material comprises a carbon fiber material.

\* \* \* \* \*